United States Patent
Imaoka

(10) Patent No.: US 9,544,458 B2
(45) Date of Patent: Jan. 10, 2017

(54) IMAGE PROCESSING APPARATUS INCLUDING A STANDBY MODE

(71) Applicant: KYOCERA Document Solutions Inc., Osaka-shi, Osaka (JP)

(72) Inventor: Kunio Imaoka, Osaka (JP)

(73) Assignee: KYOCERA DOCUMENT SOLUTIONS INC., Osaka-Shi, Osaka (JP)

(*) Notice: Subject to any disclaimer, the term of this patent is extended or adjusted under 35 U.S.C. 154(b) by 0 days.

(21) Appl. No.: 14/938,864

(22) Filed: Nov. 12, 2015

(65) Prior Publication Data

US 2016/0150114 A1    May 26, 2016

(30) Foreign Application Priority Data

Nov. 21, 2014  (JP) ................................. 2014-236415

(51) Int. Cl.
*H04N 1/00*    (2006.01)
(52) U.S. Cl.
CPC ...... *H04N 1/00896* (2013.01); *H04N 1/00204* (2013.01); *H04N 2201/0094* (2013.01)
(58) Field of Classification Search
None
See application file for complete search history.

(56) References Cited

U.S. PATENT DOCUMENTS

| | | | | |
|---|---|---|---|---|
| 2004/0090650 A1* | 5/2004 | Okazawa | ........... | H04N 1/00204 358/1.15 |
| 2011/0116398 A1* | 5/2011 | Nakahara | .......... | H04W 52/0216 370/252 |
| 2011/0126036 A1* | 5/2011 | Hayakawa | ......... | G03G 15/5004 713/323 |

(Continued)

FOREIGN PATENT DOCUMENTS

| | | |
|---|---|---|
| JP | 2009277057 A | 11/2009 |
| JP | 2012015655 A | 1/2012 |
| JP | 2012103580 A | 5/2012 |

OTHER PUBLICATIONS

Office Action issued in the counterpart Japanese Patent Application No. 2014-236415, Aug. 17, 2016.

*Primary Examiner* — Ming Hon
(74) *Attorney, Agent, or Firm* — Viering, Jentschura & Partner mbB

(57) ABSTRACT

An image forming apparatus has a standby mode in which the image forming apparatus is ready for executing image processing and a low power consumption mode which consumes lower electric power than the standby mode. The image processing apparatus includes the following four units. The communication unit is connected to a network and communicates with other devices connected to the network. The request frequency monitoring unit acquires information indicating the frequency of requests for image processing received by the communication unit. The start-up schedule-generating unit generates a start-up schedule of the commu- (Continued)

nication unit according to the information acquired by the request frequency monitoring unit. The power control unit switches, when the image processing apparatus is in the low power consumption mode, power supply modes for the communication unit in accordance with the start-up schedule that is generated by the start-up schedule-generating unit.

1 Claim, 6 Drawing Sheets

(56) References Cited

U.S. PATENT DOCUMENTS

| | | |
|---|---|---|
| 2011/0317217 A1 | 12/2011 | Taniuchi |
| 2012/0159223 A1* | 6/2012 | Furubayashi ......... G06F 1/3209 713/323 |
| 2012/0274973 A1* | 11/2012 | Nishikawa ......... G06K 15/4055 358/1.14 |

* cited by examiner

IMAGE PROCESSING APPARATUS INCLUDING A STANDBY MODE

INCORPORATION BY REFERENCE

The disclosure of Japanese Patent Application No. 2014-236415 filed on Nov. 21, 2014, including the specification, drawings and abstract is incorporated herein by reference in its entirety.

BACKGROUND

This disclosure relates to an image forming apparatus, and more particularly relates to an image processing apparatus which has a standby mode in which the image processing apparatus is ready for executing image processing and a low power consumption mode which consumes lower electric power than the standby mode.

In recent years, multifunction peripherals (MFP) which have a plurality of functions are used in many offices. In many cases, a multifunction peripheral is used in a condition in which a multifunction peripheral is connected to an information processing terminal such as a personal computer through a network such as a local area network (LAN).

Such multifunction peripherals widely adopts a function of switching, in an unused state, an operation mode from a mode in which electric power is supplied to the entire multifunction peripheral to a low power consumption mode (a sleep mode) in which power consumption is reduced in order to reduce environment loads. Even in the low power consumption mode, electric power is supplied to a part which has a function related to reception of an instruction through a network such that an operation may be performed whenever a signal (a packet) is input thereto from an information processing terminal through the network.

A conventionally known network devices is equipped with a power control section that repeatedly performs on-off control of electric power that is to be supplied to a communication control unit, which communicates with an external devices, for the purpose of further reducing power consumption. In this technique, an off period within a period in which on-off control of electric power is performed by the power control section is set to be shorter than a transmission interval between signal transmissions from an external devices. The power control section stops the on-off control of electric power according to reception of a transmission signal from the external devices, and turns on electric power that is supplied to the communication control unit.

SUMMARY

According to an aspect of the present disclosure, an image processing apparatus has a standby mode in which the image forming apparatus is ready for executing image processing and a low power consumption mode which consumes lower electric power than the standby mode. The image processing apparatus includes a communication unit, a request frequency monitoring unit, a start-up schedule-generating unit, and a power control unit. The communication unit is connected to a network through a network interface and communicates with other devices that are connected to the network. The request frequency monitoring unit acquires information indicating the frequency of requests for image processing which have been received by the communication unit. The start-up schedule-generating unit generates a start-up schedule of the communication unit according to the information indicating the frequency of the requests which have been acquired by the request frequency monitoring unit. The power control unit switches, when the image processing apparatus is in the low power consumption mode, power supply modes for the communication unit in accordance with the start-up schedule that is generated by the start-up schedule-generating unit.

DETAILED DESCRIPTION

An embodiment of the present disclosure will be described in detail below with reference to the accompanying drawings. As a digital multifunction peripheral, a technique of the present disclosure will be specifically described below. Note that the digital multifunction peripheral is configured so as to be capable of switching a plurality of operation modes including a standby mode in which electric power is supplied to one or more units and the digital multifunction peripheral is in a state where the digital multifunction peripheral is ready for executing at least one function (image processing) and a low power consumption mode (a sleep mode) in which supplied electric power is minimized to the extent that is sufficient for executing a function such as reception of an instruction which is to be input from a user via an operation panel for reducing power consumption.

Figure 1:
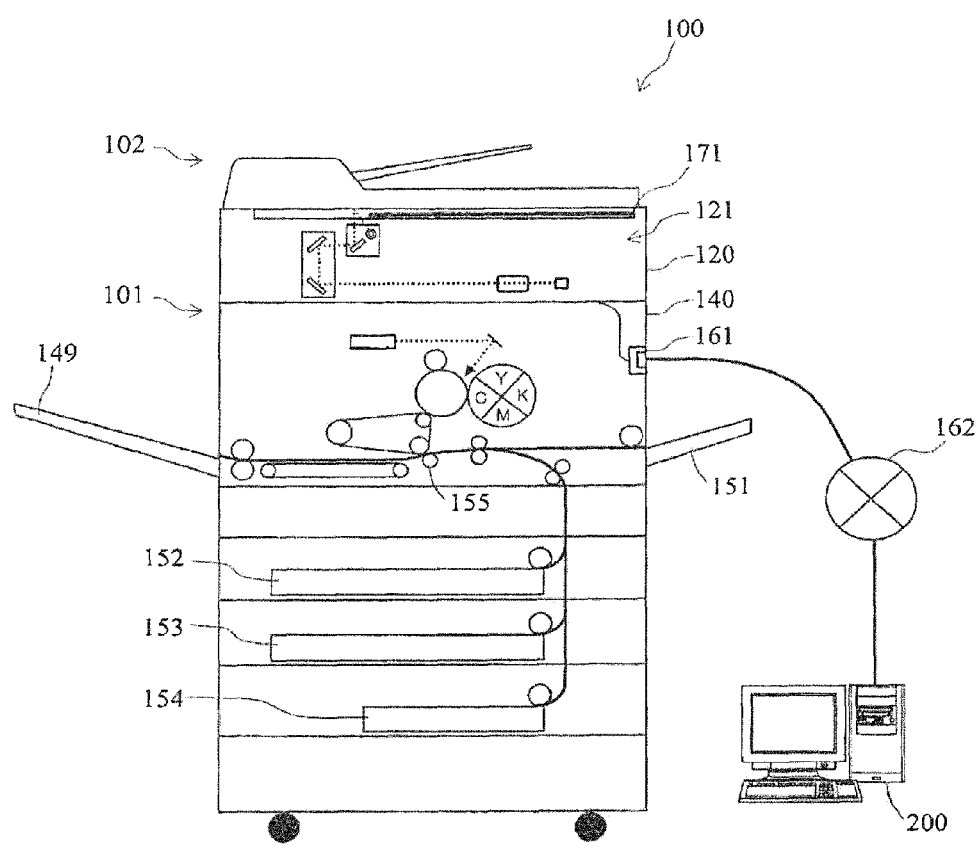
FIG. 1 shows a schematic view illustrating an entire configuration of a multifunction peripheral according to an embodiment of the present disclosure.

FIG. 1 shows a schematic view illustrating an entire configuration of a digital multifunction peripheral according to this embodiment. As illustrated in FIG. 1, a multifunction peripheral 100 includes a main body 101 including an image reading unit 120 and an image forming unit 140, and a platen cover 102 provided on an upper portion of the main body 101. An operation panel 171, which enables a user to give an instruction to start copying and other instructions to the multifunction peripheral 100 and check a state of the multifunction peripheral 100 and settings thereof, is provided in a front surface of the multifunction peripheral 100.

The image reading unit 120 is provided on the upper portion of the main body 101. The image reading unit 120 picks up an image of a document using a scanning optical system 121 and generates digital data (image data) of the image.

The generated image data may be printed on a sheet of paper in the image forming unit 140. The generated image data may be transmitted to other devices via a network interface 161 through a network.

The image forming unit 140 prints out image data generated by the image reading unit 120 and image data received from the other devices that are connected to a network 162 on the sheet of paper. Note that only an information processing terminal 200 is illustrated as the other devices in FIG. 1.

The image forming unit 140 feeds a sheet of paper to a transfer unit 155 which transfers a toner image from one of a manual paper feeding tray 151, paper feeding cassettes 152, 153, and 154, and the like. The sheet of paper to which the toner image was transferred in the transfer unit 155 is discharged to a discharging tray 149.

Figure 2:
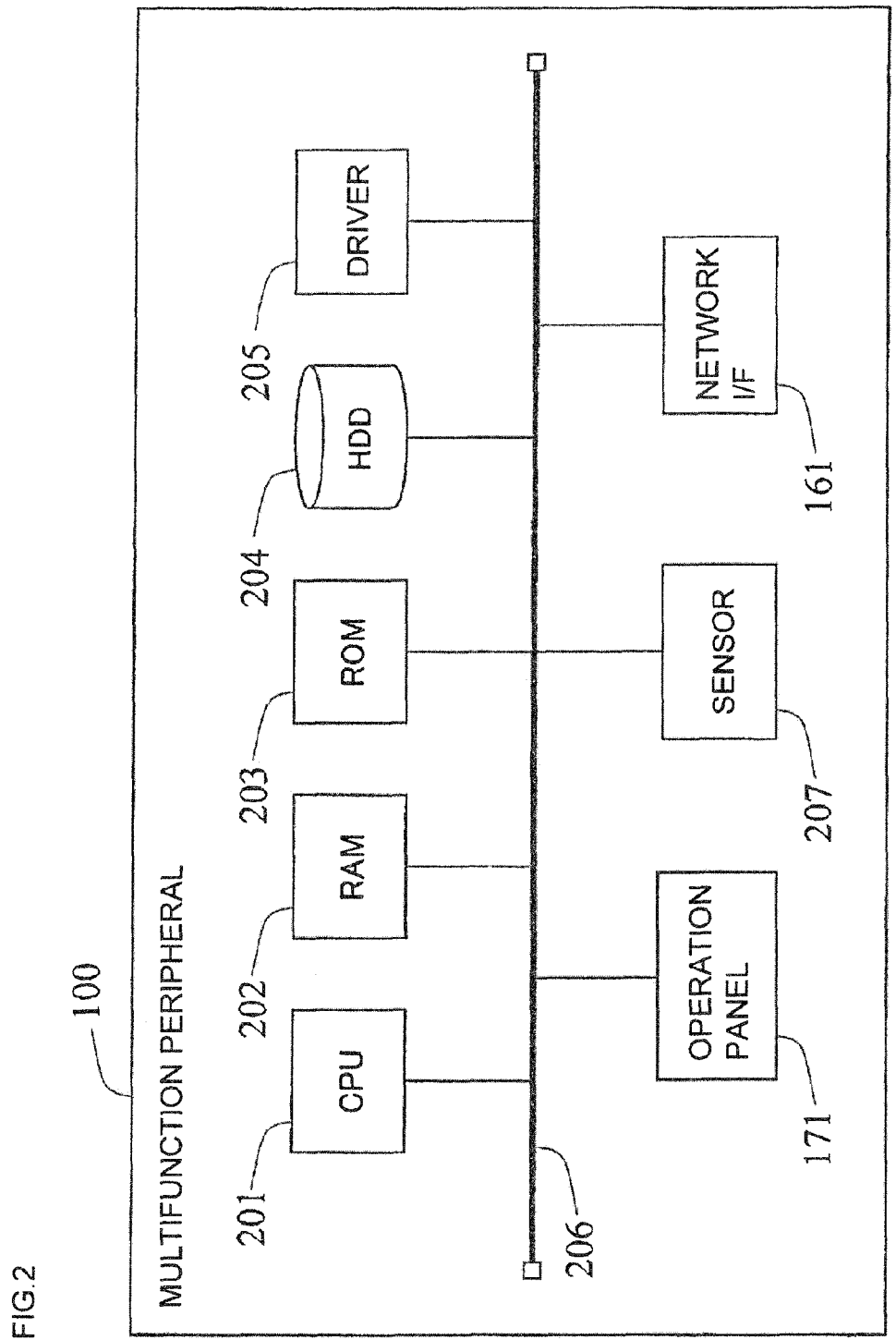
FIG. 2 shows a diagram illustrating a hardware configuration of a multifunction peripheral according to an embodiment.

FIG. 2 shows a hardware configuration diagram of a control system in a multifunction peripheral. In the multifunction peripheral 100 of this embodiment, a central processing unit (CPU) 201, a random access memory (RAM) 202, a read only memory (ROM) 203, a hard disk drive (HDD) 204, and a driver 205, which corresponds to each drive unit in the image reading unit 120 and the image forming unit 140, are connected to one another via an internal bus 206. The ROM 203 and the HDD 204 store programs, and the CPU 201 controls the multifunction peripheral 100 in accordance with an instruction of a control program. For example, the CPU 201 uses the RAM 202 as a work area and gives or receives data and an order to or from the driver 205, thereby controlling the operation of each of the above-described drive units. The HDD 204 is used also for storing image data which have been acquired by the image reading unit 120 and image data which have been received from the other devices through the network interface 161.

The operation panel 171 and sensors 207 of various types are also connected to the internal bus 206. The operation panel 171 receives an operation of the user and supplies a signal based on the operation to the CPU 201. Also, the operation panel 171 displays an operation screen on a display of the operation panel 171 in accordance with a control signal from the CPU 201. The sensors 207 includes various types of sensors such as an open and close detection sensor of the platen cover 102, a document detection sensor on a platen, a temperature sensor of a fixing device, a detection sensor of a conveyed sheet of paper or document.

The CPU 201 executes, for example, a program stored in the ROM 203, thereby realizing following each unit (function block) and controlling the operation of each unit in accordance with signals from the above-described sensors.

Figure 3:
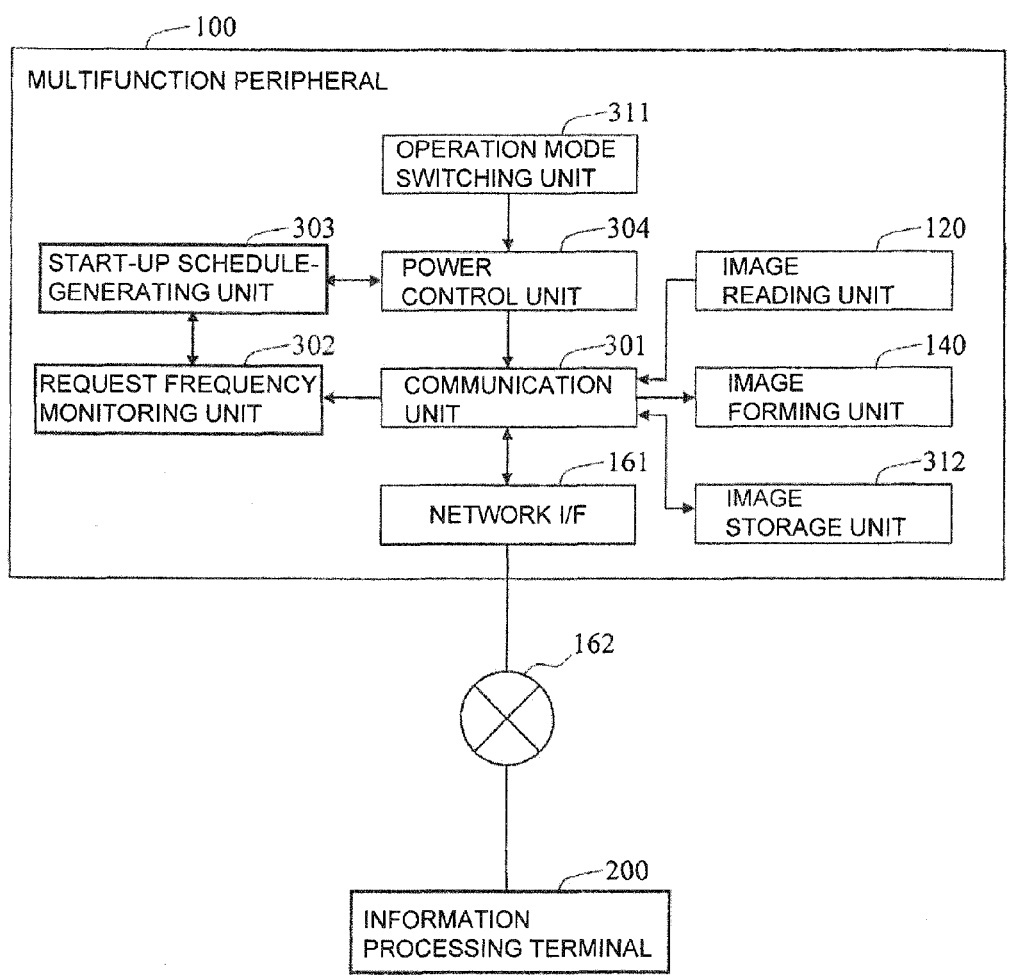
FIG. 3 shows a functional block diagram illustrating a multifunction peripheral according to an embodiment.

FIG. 3 is a functional block diagram of a multifunction peripheral of this embodiment. As illustrated in FIG. 3, the multifunction peripheral 100 of this embodiment includes a communication unit 301, a request frequency monitoring unit 302, a start-up schedule-generating unit 303, a power control unit 304, and an operation mode switching unit 311.

The operation mode switching unit 311 switches a plurality of operation modes including the standby mode and the low power consumption mode, which have been described above. The standby mode includes a mode in which the multifunction peripheral 100 is ready for immediately executing only one of functions which the multifunction peripheral 100 can execute (i.e. an image reading function, an image forming function, a facsimile transmission and reception function, and a network transmission and reception function), as well as a mode in which the multifunction peripheral 100 is ready for immediately executing only some of the functions (for example, a mode in which electric power supply to an device, such as the fixing device that consumes large electric power, is stopped and the image forming function can not be immediately executed), and a mode in which the multifunction peripheral 100 is ready for immediately executing all of the functions. In the low power consumption mode, electric power is supplied to only a part of the multifunction peripheral 100, and thus, the multifunction peripheral 100 is maintained in a state where whether or not a shift condition for switching an operation mode from the low power consumption mode to another operation mode is satisfied may be detected. For example, electric power supply to devices which are not related to detection on whether or not the shift condition is satisfied such as sensors (including the platen cover open and close detection sensor, and the document detection sensor), the RAM 202, the HDD 204, and units (the image reading unit 120 and the image forming unit 140) is stopped. Moreover, only minimum electric power which is sufficient for the above-described detection is supplied to the CPU 201.

In this embodiment, when the multifunction peripheral 100 is in the standby mode, for example, a state without any instruction to the multifunction peripheral 100 continues for a certain period designated in advance, the operation mode switching unit 311 switches the operation mode from the standby mode to the low power consumption mode. If an instruction is input by the user via the operation panel 171 when the multifunction peripheral 100 is in the low power consumption mode, the operation mode switching unit 311 switches the operation mode from the low power consumption mode to the standby mode in accordance with the instruction of the user.

The communication unit 301 is connected to the network 162 via the network interface 161 and communicates with other devices that are connected to the network 162 (for example, the information processing terminal 200). For example, when image data is input with an image formation instruction from the information processing terminal 200, the communication unit 301 inputs the input image data to the image forming unit 140. When an image reading instruction in the image reading unit 120 is input from the information processing terminal 200, the communication unit 301 transmits the image data generated in the image reading unit 120 to the information processing terminal 200. When image data is input with an image storage instruction from the image processing terminal 200, the communication unit 301 inputs the input image data to the image storage unit 312. Furthermore, when a readout instruction for reading out the image data stored in the image storage unit 312 is input from the information processing terminal 200, the communication unit 301 reads out the designated image data from the image storage unit 312 and transmits the readout image data to the information processing terminal 200. Note that the image storage unit 312 is realized, for example, by the HDD 204.

The request frequency monitoring unit 302 acquires information indicating the frequency of image processing requests (request frequency information) performed by the communication unit 301. The image processing requests include instructions to cause the execution of the functions (the image processing functions) of the multifunction peripheral 100, such as the image formation instruction, the image read instruction, the image storage instruction, and the image readout instruction, which have been described above The image processing requests do not include an instruction that does not cause the execution of a function of the multifunction peripheral 100, such as an instruction for broadcasting.

Although not particularly limited, in this embodiment, the request frequency monitoring unit 302 records, as the information indicating the frequency of requests, time information regarding a time of input of an image processing request to the communication unit 301 through the network 162. The time information means information that may specify, for example, a second, a minute, an hour, a day, a month, and a year.

The start-up schedule-generating unit 303 generates a start-up schedule of the communication unit 301 according to the information indicating the frequency of requests which is acquired by the request frequency monitoring unit 302. In this case, the start-up schedule defines a power supply mode for the communication unit 301 for each time zone. As will be described later, in this embodiment, the power supply mode includes a plurality of power supply modes with different start-up time of the communication unit 301.

In this embodiment, the start-up schedule-generating unit 303 first acquires the information indicating the frequency of the requests in a period designated in advance (for example, one week or one month) from the request frequency monitoring unit 302. Then, the start-up schedule-generating unit 303 counts the number of times of the input of the image processing requests to the communication unit 301 for each designated time zone. A method for setting the time zone is not particularly limited. For example, a method in which one day is divided into twenty four time zones, that is, a time zone is set by hour, and the number of the input of the image processing requests in each time zone is counted may be employed. Alternatively, a method in which the image processing requests are counted for each time zone of each day of the week may be employed. Also, a method in which the image processing requests are counted for each time zone for each of a business day and a non-business day may be employed.

Figure 4:
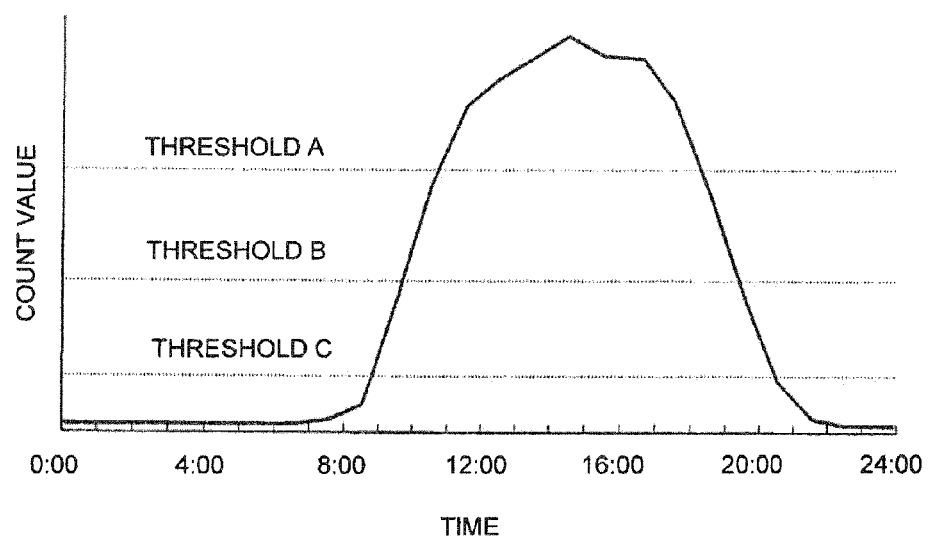
FIG. 4 shows a graph illustrating the frequency of requests according to an embodiment.

In this embodiment, the start-up schedule-generating unit 303 compares a threshold designated in advance and a count value for the image processing requests in each time zone, and thus, generates the start-up schedule. FIG. 4 is a graph illustrating an example of the count value for each time zone, counted by the start-up schedule-generating unit 303 for a period designated in advance. In FIG. 4, the abscissa axis corresponds to time (the time zone), and the ordinate axis corresponds to the count value. In FIG. 4, the image processing requests are counted for each time zone set by each hour, that is, for example, 0:00 to 1:00.

In FIG. 4, the above-described threshold is also illustrated. In this example, three thresholds (a threshold A, a threshold B, and a threshold C) are set in advance, and the start-up schedule is determined based on the magnitude relationship between each of the respective count values of the time zones and each threshold. That is, a power supply method (the power supply mode) for supplying electric power to the communication unit 301 is selected depending on to which of a range of less than the threshold C, a range of not less than the threshold C but less than threshold B, a range of not less than the threshold B but less than the threshold A, and a range of not less than the threshold A each of the count values belongs.

Figure 5:
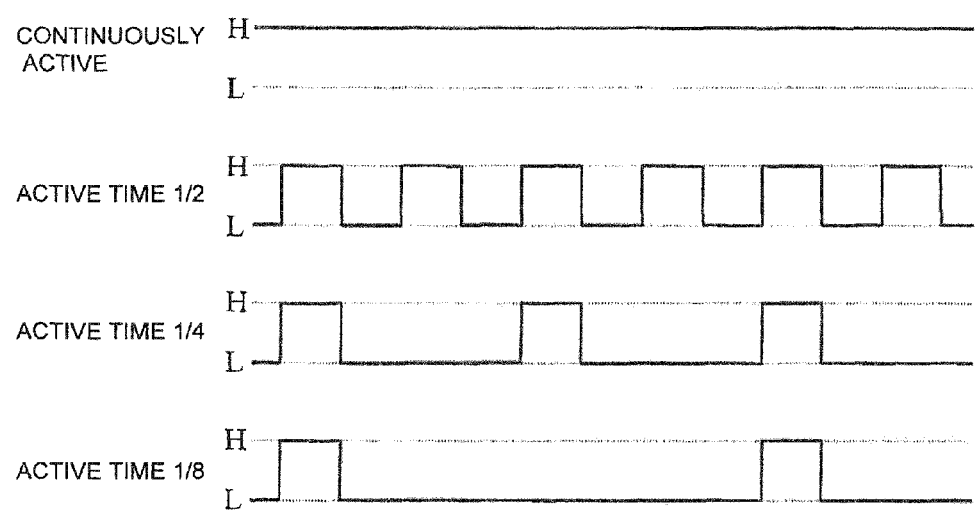
FIG. 5 shows a chart illustrating an example of a power supply mode for a communication unit.

FIG. 5 is a chart illustrating an example of the power supply mode which may be selected in this embodiment. In FIG. 5, a "high level" corresponds to a state where electric power is supplied to the communication unit 301 and a "low level" corresponds to a state where electric power is not supplied to the communication unit 301 (or a state where electric power supply to the communication unit 301 is blocked). Note that electric power supply to the communication unit 301 and blocking thereof may be implemented by a known method in which, for example, a switch is provided in an electric power supply path to the communication unit 301 to switch an on-off state of the switch.

In FIG. 5, four modes of "CONTINUOUSLY ACTIVE", "ACTIVE TIME ½", "ACTIVE TIME ¼", and "ACTIVE TIME ⅛" are illustrated as the power supply mode. The "CONTINUOUSLY ACTIVE" mode is the power supply mode in which the communication unit 301 is made continuously active, and electric power is supplied to the communication unit 301 at all times.

The "ACTIVE TIME ½" mode is the power supply mode in which an active time of the communication unit 301 is made ½ relative to the "CONTINUOUSLY ACTIVE" mode, and a cycle of power supply and blocking of power supply is repeated in a time period designated for the communication unit 301 in advance. For example, this power supply mode includes a cycle in which power supply is continued for 10 seconds and then blocked for 10 seconds.

The "ACTIVE TIME ¼" mode is the power supply mode in which the active time of the communication unit 301 is made ¼ relative to the "CONTINUOUSLY ACTIVE" mode, and a cycle of power supply and blocking of power supply is repeated in a time period designated for the communication unit 301 in advance. For example, this power supply mode includes a cycle in which power supply is continued for 10 seconds and then blocked for 30 seconds.

The "ACTIVE TIME ⅛" mode is the power supply mode in which the active time of the communication unit 301 is made ⅛ relative to the "CONTINUOUSLY ACTIVE" mode, and a cycle of power supply and blocking of power supply is repeated in a time period designated for the communication unit 301 in advance. This power supply mode includes a cycle in which, for example, power supply is continued for 10 seconds and then power supply is blocked for 70 seconds.

In the example of FIG. 4, each of the count values of the time zones from 0:00 to 9:00 and from 20:00 to 24:00 is less than the threshold C. In this case, the start-up schedule-generating unit 303 generates the start-up schedule such that the "ACTIVE TIME ⅛" mode is selected as the power supply mode for the above-described time zones.

Each of the count values of the time zones from 9:00 to 10:00 and from 19:00 to 20:00 is not less than the threshold C but less than the threshold B. In this case, the start-up schedule-generating unit 303 generates the start-up schedule such that the "ACTIVE TIME ¼" mode is selected as the power supply mode for the above-described time zones.

Each of the count values of the time zones from 10:00 to 11:00 and from 18:00 to 19:00 is not less than the threshold B but less than the threshold A. In this case, the start-up schedule-generating unit 303 generates the start-up schedule such that the "ACTIVE TIME ½" mode is selected as the power supply mode for the above-described time zones.

Each of the count values of the time zones from 11:00 to 18:00 is not less than the threshold A. In this case, the start-up schedule-generating unit 303 generates the start-up schedule such that the "CONTINUOUSLY ACTIVE" mode is selected as the power supply mode for the above-described time zones.

Note that an acquisition timing at which the information indicating the frequency of requests is acquired by the start-up schedule-generating unit 303 is not particularly limited. In this embodiment, the start-up schedule-generating unit 303 acquires the information indicating the frequency of requests for a period designated in advance from the request frequency monitoring unit 302 at time intervals (of, for example, one day) designated in advance. The start-up schedule-generating unit 303 generates a new start-up schedule each time the start-up schedule-generating unit 303 acquires the require frequency information.

When the multifunction peripheral 100 is in the low power consumption mode, the power control unit 304 switches the power supply mode for the communication unit 301 in accordance with the start-up schedule generated by the start-up schedule-generating unit 303. Although not particularly limited, the power control unit 304 switches the above-described four power supply modes for the communication unit 301 in this embodiment. Note that, in this embodiment, the power control unit 304 recognizes that the multifunction peripheral 100 is in the low power consumption mode through communication from the operation mode switching unit 311 in switching the operation mode.

An acquisition method employed by the power control unit 304 for acquiring the start-up schedule from the start-up schedule-generating unit 303 is not particularly limited. In this embodiment, a method in which, when the multifunction peripheral 100 is put in the low power consumption mode, the power control unit 304 acquires the start-up schedule from the start-up schedule-generating unit 303 is adopted. Not only the above method, but also, for example, a configuration in which the power control unit 304 acquires the start-up schedule at predetermined time intervals, a method in which, when the start-up schedule is updated by the start-up schedule-generating unit 303, the power control unit 304 acquires the start-up schedule may be employed.

Figure 6:
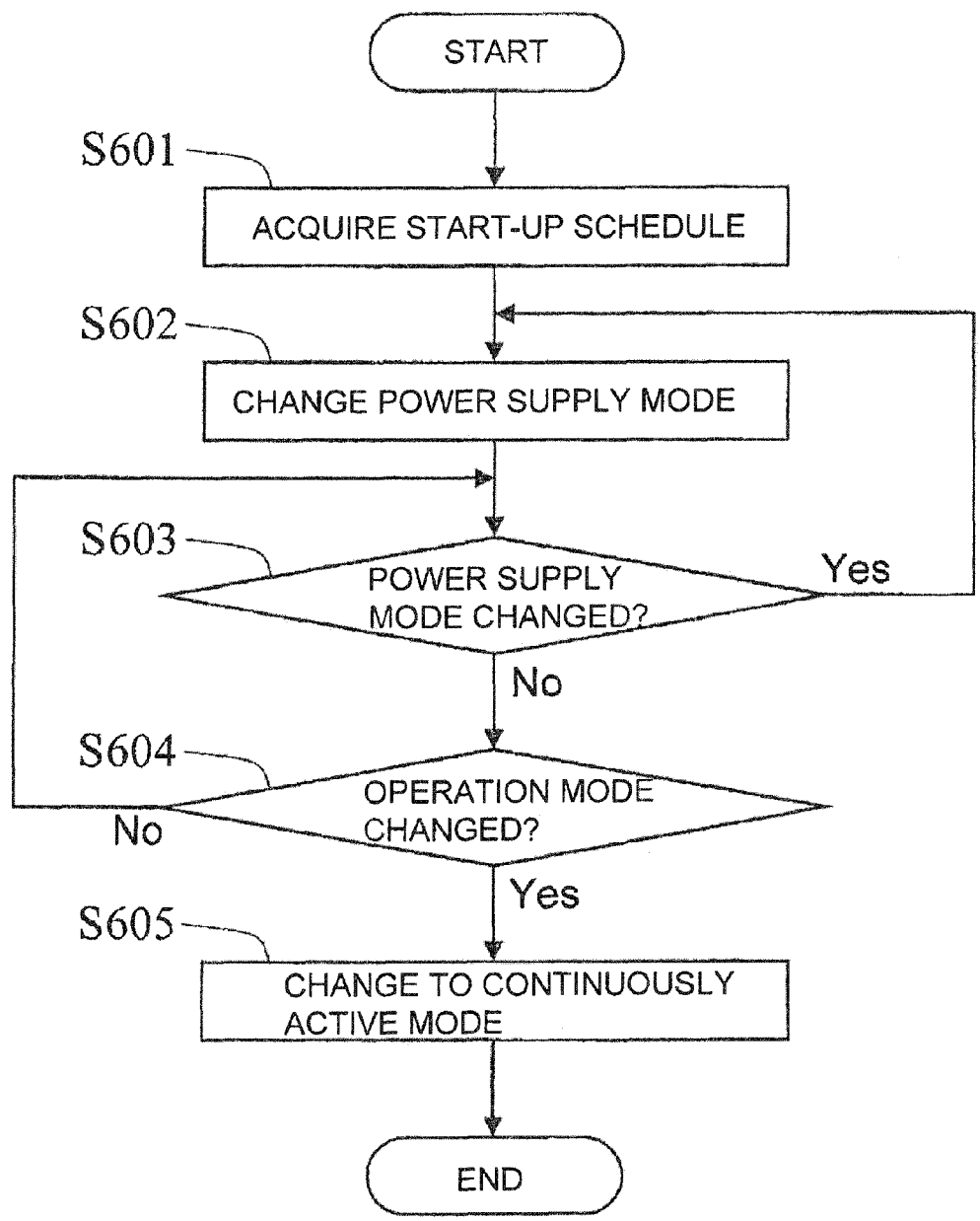
FIG. 6 shows a flow chart illustrating an example of electric power control steps executed by a multifunction peripheral according to an embodiment.

FIG. 6 is a flow chart illustrating an example of electric power control steps executed by the multifunction peripheral 100. The above steps are triggered by switching of the operation mode of the multifunction peripheral 100 to the low power consumption mode by the operation mode switching unit 311.

When the steps are started, the power control unit 304 acquires the start-up schedule of the start-up schedule-generating unit 303 (Step S601). In this case, the power control unit 304 acquires time information at that time, and recognizes the power supply mode designated by the start-up schedule from the acquired time information and the acquired start-up schedule. The power control unit 304 which has recognized the power supply mode from the start-up schedule changes the power supply mode for the communication unit 301 to the recognized power supply mode (Step S602). The power control unit 304 maintains this power supply mode until a different power supply mode is designated in the start-up schedule (NO in Step S603, NO in Step S604). When a time when a different power supply mode is designated in the start-up schedule comes, the power control unit 304 changes the power supply mode in accordance with the start-up schedule (YES in Step S603, Step S602).

A situation where the power control unit 304 maintains the power supply modes to be a specific power supply mode is assumed. In this situation, when the user inputs an instruction that causes a shift from the low power consumption mode to the standby mode through the operation panel 171 or when an instruction that causes a shift from the low power consumption mode to the standby mode is input through the network 162 at a timing while electric power is supplied to the communication unit 301, the operation mode switching unit 311 switches the operation mode of the multifunction peripheral 100 from the low power consumption mode to the standby mode. In this case, the power control unit 304 is notified of this switching by the operation mode switching unit 311 (YES in Step S604). In this case, the power control unit 304 changes the power supply mode for the communication unit 301 to the "CONTINUOUSLY ACTIVE" mode (Step S605).

Note that, at a timing while electric power is not supplied to the communication unit 301, the communication unit 301 does not recognize an instruction given through the network 162. Therefore, a state where electric power supply to the communication unit 301 is blocked is not cancelled by an instruction (a signal) given through the network 162.

At a timing while electric power is not supplied to the communication unit 301, an instruction (a signal) output to the multifunction peripheral 100 from the information processing terminal 200 is not received by the communication unit 301, for example. In this case, in the information processing terminal 200, a retry operation in which an instruction is retransmitted at predetermined time intervals is executed. The communication unit 301 may recognize the instruction by designing a power supply cycle in the power supply mode or a time interval for repeating the retry operation such that, even in a situation where the power supply mode in which the active time of the communication unit 301 is reduced is selected by the power control unit 304, the retry operation is executed while electric power is supplied to the communication unit 301.

Acquisition of the information indicating the frequency of requests by the request frequency monitoring unit 302 is continued even in a situation where the power supply mode in which the active time of the communication unit 301 is reduced is selected by the power control unit 304. In this case, the request frequency monitoring unit 302 records only the image processing requests input to the communication unit 301 while electric power is supplied to the communication unit 301.

As described above, in the multifunction peripheral 100, a time during which the communication unit 301 is active (a time during which electric power is supplied to the communication unit 301) may be varied in accordance with the frequency of the image processing requests which were actually made. Therefore, as described above, the time during which the communication unit 301 is active can be increased in a time zone in which a large number of image processing requests are made, and the time during which the communication unit 301 is active can be reduced in a time zone in which a small number of image processing requests are made. Therefore, the time during which the communication unit 301 is active may be varied in accordance with a use environment of the user.

Also, the communication unit 301 is not started up in response to a signal that is not related to processing performed in the multifunction peripheral 100 and also, in a time zone in which the request frequency is low, the time during which the communication unit 301 is not active is increased. As a result, the power consumption of the communication unit 301 can be smaller. On the other hand, in a time zone in which the request frequency is high, the time during which the communication unit 301 is active is increased, and therefore, the image processing request is received by the multifunction peripheral 100 without waiting for the retry operation. Therefore, an abnormal increase in waiting time of the user is prohibited.

In addition, a signal addressed to the multifunction peripheral 100, which has reached the multifunction peripheral 100 in a time zone in which the communication unit 301 is not active, is not received by the communication unit 301, but the signal is received by the multifunction peripheral 100 in the retry operation in a signal transmission source.

Note that the above-described embodiment is not intended to limit the technical scope of the present disclosure and, in addition to the above-described embodiment, various modifications and applications are possible within the scope of the present disclosure. For example, in the above-described embodiment, the start-up schedule is set using the four modes of "CONTINUOUSLY ACTIVE", "ACTIVE TIME ½", "ACTIVE TIME ¼", and "ACTIVE TIME ⅛", but the start-up schedule may be set using a mode that supplies more electric power or less electric power.

In the flow chart of FIG. 6, the order of steps may be changed, as appropriate, within a range in which equivalent advantages may be achieved. For example, the start-up schedule is acquired first in FIG. 6, but the power control unit 304 may acquire the start-up schedule in advance before the steps are started.

In addition, although in the above-described embodiment, a technique of the present disclosure is embodied by a digital multifunction peripheral, application of the embodied technique is not limited to a digital multifunction peripheral. The embodied technique may be applied to any image processing apparatus, such as a scanner, a printer, a copying machine, and the like apparatuses.

According to the present disclosure, power consumption related to network communication in the low power consumption mode may be reduced, and thus, the present disclosure may be useful as an image processing apparatus.

What is claimed is:

1. An image forming apparatus, having
   a standby mode in which the image forming apparatus is ready for executing image processing and a low power consumption mode which consumes lower electric power than the standby mode,
   the image forming apparatus comprising:
   a CPU that implements
   a communication unit configured to be connected to a network through a network interface and to communicate with other devices that are connected to the network;
   a request frequency monitoring unit configured to acquire information indicating the frequency of requests for image processing which have been received by the communication unit;
   a start-up schedule-generating unit configured to generate a start-up schedule of the communication unit according to the information indicating the frequency of the requests which have been acquired by the request frequency monitoring unit; and
   a power control unit configured to switch, when the image processing apparatus is in the low power consumption mode, power supply modes for the communication unit in accordance with the start-up schedule that is generated by the start-up schedule-generating unit,
   wherein the start-up schedule-generating unit generates the start-up schedule according to a threshold that is designated in advance and the information indicating the frequency of requests in a period that is designated in advance,
   wherein the power supply mode includes a plurality of power supply modes with different start-up time of the communication unit, and
   wherein the length of each high level period is the same and the length of each low level period is different among the plurality of power supply modes.

* * * * *